United States Patent
Cricri et al.

(10) Patent No.: US 10,935,796 B2
(45) Date of Patent: Mar. 2, 2021

(54) SENSOR DATA CONVEYANCE

(71) Applicant: Nokia Technologies Oy, Espoo (FI)

(72) Inventors: Francesco Cricri, Tampere (FI); Vinod Kumar Malamal Vadakital, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/155,819

(22) Filed: May 16, 2016

(65) Prior Publication Data

US 2016/0341968 A1    Nov. 24, 2016

(30) Foreign Application Priority Data

May 18, 2015  (EP) .................................... 15167968

(51) Int. Cl.
| | | |
|---|---|---|
| *G02B 27/01* | (2006.01) | |
| *G02B 27/00* | (2006.01) | |
| *G06F 3/01* | (2006.01) | |
| *G06K 9/00* | (2006.01) | |
| *G06T 19/00* | (2011.01) | |
| *G08B 21/02* | (2006.01) | |

(52) U.S. Cl.
CPC ..... *G02B 27/0179* (2013.01); *G02B 27/0093* (2013.01); *G02B 27/017* (2013.01); *G02B 27/0172* (2013.01); *G06F 3/017* (2013.01); *G06K 9/00335* (2013.01); *G06T 19/006* (2013.01); *G02B 2027/014* (2013.01); *G02B 2027/0138* (2013.01); *G02B 2027/0187* (2013.01); *G08B 21/02* (2013.01)

(58) Field of Classification Search
None
See application file for complete search history.

(56) References Cited

U.S. PATENT DOCUMENTS

| | | |
|---|---|---|
| 6,992,702 B1 | 1/2006 | Foote et al. |
| 7,483,057 B2 | 1/2009 | Grosvenor et al. |
| 2010/0182136 A1 | 7/2010 | Pryor |

(Continued)

FOREIGN PATENT DOCUMENTS

| | | |
|---|---|---|
| EP | 3 037 917 A1 | 6/2016 |
| WO | WO-0239716 | 5/2002 |

OTHER PUBLICATIONS

European Search Report for priority application EP15167968, dated Oct. 30, 2015.

(Continued)

*Primary Examiner* — Krishna P Neupane
(74) *Attorney, Agent, or Firm* — Alston & Bird LLP

(57) ABSTRACT

According to an example aspect, there is provided an apparatus comprising at least one processing core, at least one memory including computer program code, the at least one memory and the computer program code being configured to, with the at least one processing core, cause the apparatus at least to obtain, using a first image recognition or depth sensing mechanism, first information defining an input space, obtain, using the first or a second image recognition or depth sensing mechanism, second information defining a virtual output area, and cause rendering of sensor information captured from the input space into the virtual output area.

20 Claims, 5 Drawing Sheets

(56) References Cited

U.S. PATENT DOCUMENTS

| | | | |
|---|---|---|---|
| 2013/0021374 A1* | 1/2013 | Miao | G06F 3/011 |
| | | | 345/633 |
| 2013/0182107 A1 | 7/2013 | William | |
| 2013/0257750 A1 | 10/2013 | Weldon et al. | |
| 2013/0321462 A1* | 12/2013 | Salter | G06F 1/163 |
| | | | 345/633 |
| 2014/0006026 A1* | 1/2014 | Lamb | G10L 17/00 |
| | | | 704/246 |
| 2014/0225918 A1* | 8/2014 | Mittal | G06F 3/017 |
| | | | 345/633 |
| 2015/0016777 A1 | 1/2015 | Abovitz et al. | |
| 2015/0085171 A1* | 3/2015 | Kim | H04N 13/344 |
| | | | 348/333.04 |
| 2015/0199816 A1* | 7/2015 | Freeman | G06K 9/00362 |
| | | | 345/633 |
| 2017/0214899 A1* | 7/2017 | Meier | H04N 13/0011 |

OTHER PUBLICATIONS

"Security Monitor Pro _ Triggering Alerts When Motion Detected." [retrieved Sep. 27, 2017]. Retrieved from the Internet: <URL: http://www.deskshare.com/help/smp/onmotion-detection.aspx>. (undated); 3 pages.

Ciavolino, Amy et al. "Towards Affordable Gesture based Interfaces— An Exploration with Wii Remotes." IMAGAPP & IVAPP— Proceedings of the International Conference on Imaging Theory and Applications and International Conference on Information Visualization Theory and Applications; Vilamoura, Algarve, Portugal; Mar. 5-7, 2011; pp. 224-229.

\* cited by examiner

SENSOR DATA CONVEYANCE

FIELD

The present invention relates to the field of management of sensor information, such as, for example, in operating a sensor-based surveillance system.

BACKGROUND

Video monitoring may be employed to observe persons or events in an area of interest. For example, a grocery store may choose to install closed-circuit television, CCTV, cameras in a section of the store that is prone to theft, such as for example the beer selection. Likewise, banks or jewellery stores may use recording CCTV to help deter crime and discover identities of persons that steal or attempt to steal money or valuables.

CCTV feeds may be viewed in real time in control rooms on hardware screens and/or the feeds may be recorded, the recordings being retained at least temporarily. In some implementations, the recording is partial, comprising a still image captured from a video CCTV feed every 200 milliseconds, for example.

Parents may use microphones configured to detect crying, so as to be alerted when their young children wake up and cry, so these children can be looked after. Likewise in the home, motion-detecting cameras may be installed to take still or video images responsive to the motion-detecting feature of these cameras detecting movement. The images may be transmitted, for example, via multimedia messaging, MMS, to a smartphone of a person residing in the home.

Occasionally, a parent may employ a webcam to keep an eye on his child, the webcam being arranged to provide a video feed into a window on a desktop of the parent's computer user interface. The user interface may comprise, for example, a Microsoft Windows user interface. Thus the parent is enabled to continually view his child, at the expense of some screen space on his computer. In addition to screen space, the parent's attention may be partially diverted to the webcam window.

Gesture input is one way to interact with devices, such as gaming consoles or smartphones. An advantage of gesture input is that the user needn't touch the device, which is useful in case the device isn't in reach for the user, or if the user has dirty hands. The user's hands may be dirtied from working on a car engine or baking bread, for example. Gesture input may comprise an imaging sensor configured to provide information to a sensory algorithm designed to recognize and classify gestures performed by the user.

SUMMARY OF THE INVENTION

The invention is defined by the features of the independent claims. Some specific embodiments are defined in the dependent claims.

According to a first aspect of the present invention, there is provided an apparatus comprising at least one processing core, at least one memory including computer program code, the at least one memory and the computer program code being configured to, with the at least one processing core, cause the apparatus at least to obtain, using a first image recognition or depth sensing mechanism, first information defining an input space, obtain, using the first or a second image recognition or depth sensing mechanism, second information defining a virtual output area, and cause rendering of sensor information captured from the input space into the virtual output area.

Various embodiments of the first aspect may comprise at least one feature from the following bulleted list:
- the at least one memory and the computer program code are configured to, with the at least one processing core, cause the apparatus to cause the sensor information to be rendered in the virtual output area via a head mounted display, to enable a user to experience the virtual output area as a virtual screen hovering in air
- the head mounted display comprises at least one of an eyeglass display and a projector configured to project optically encoded information directly to an eye
- the apparatus is configured to provide, based at least in part on the first information, control inputs to a sensor device to cause the sensor device to capture the sensor information from the input space
- the first image recognition or depth sensing mechanism comprises a software mechanism configured to determine the first information based on at least one optical sensor and a depth sensing capability
- the second image recognition or depth sensing mechanism comprises a software mechanism configured to determine the second information based on at least one optical sensor and a depth sensing capability
- the at least one memory and the computer program code are configured to, with the at least one processing core, cause the apparatus to cause the rendering of the sensor information in the virtual output area in a continuous manner
- the at least one memory and the computer program code are configured to, with the at least one processing core, cause the apparatus to cause the rendering of the sensor information in the virtual output area responsive to a determination concerning the input space
- the determination concerning the input space comprises a determination there is movement in the input space
- the determination there is movement in the input space is based on the sensor information
- the determination there is movement in the input space is based on depth information comprised in the sensor information
- the determination concerning the input space comprises a determination that a sound level in or near the input space exceeds a threshold sound level.

According to a second aspect of the present invention, there is provided a method comprising obtaining, using a first image recognition or depth sensing mechanism, first information defining an input space, obtaining, using the first or a second image recognition or depth sensing mechanism, second information defining a virtual output area, and causing rendering of sensor information captured from the input space into the virtual output area.

Various embodiments of the second aspect may comprise at least one feature corresponding to a feature from the preceding bulleted list laid out in connection with the first aspect.

According to a third aspect of the present invention, there is provided an apparatus comprising means for obtaining, using a first image recognition or depth sensing mechanism, first information defining an input space, means for obtaining, using the first or a second image recognition or depth sensing mechanism, second information defining a virtual output area, and means for causing rendering of sensor information captured from the input space into the virtual output area.

According to a fourth aspect of the present invention, there is provided a non-transitory computer readable medium having stored thereon a set of computer readable instructions that, when executed by at least one processor, cause an apparatus to at least obtain, using a first image recognition or depth sensing mechanism, first information defining an input space, obtain, using the first or a second image recognition or depth sensing mechanism, second information defining a virtual output area, and cause rendering of sensor information captured from the input space into the virtual output area.

According to a fifth aspect of the present invention, there is provided a computer program configured to cause a method in accordance with the second aspect to be performed.

EMBODIMENTS

A user may be enabled to indicate an input space and an output area by gestures that are registered by automated equipment. Subsequently, a sensor feed, such as a video feed, from the input space may be provided to the output area, for example via a head mounted display so that the user's existing displays are not burdened by the output area.

Figure 1:
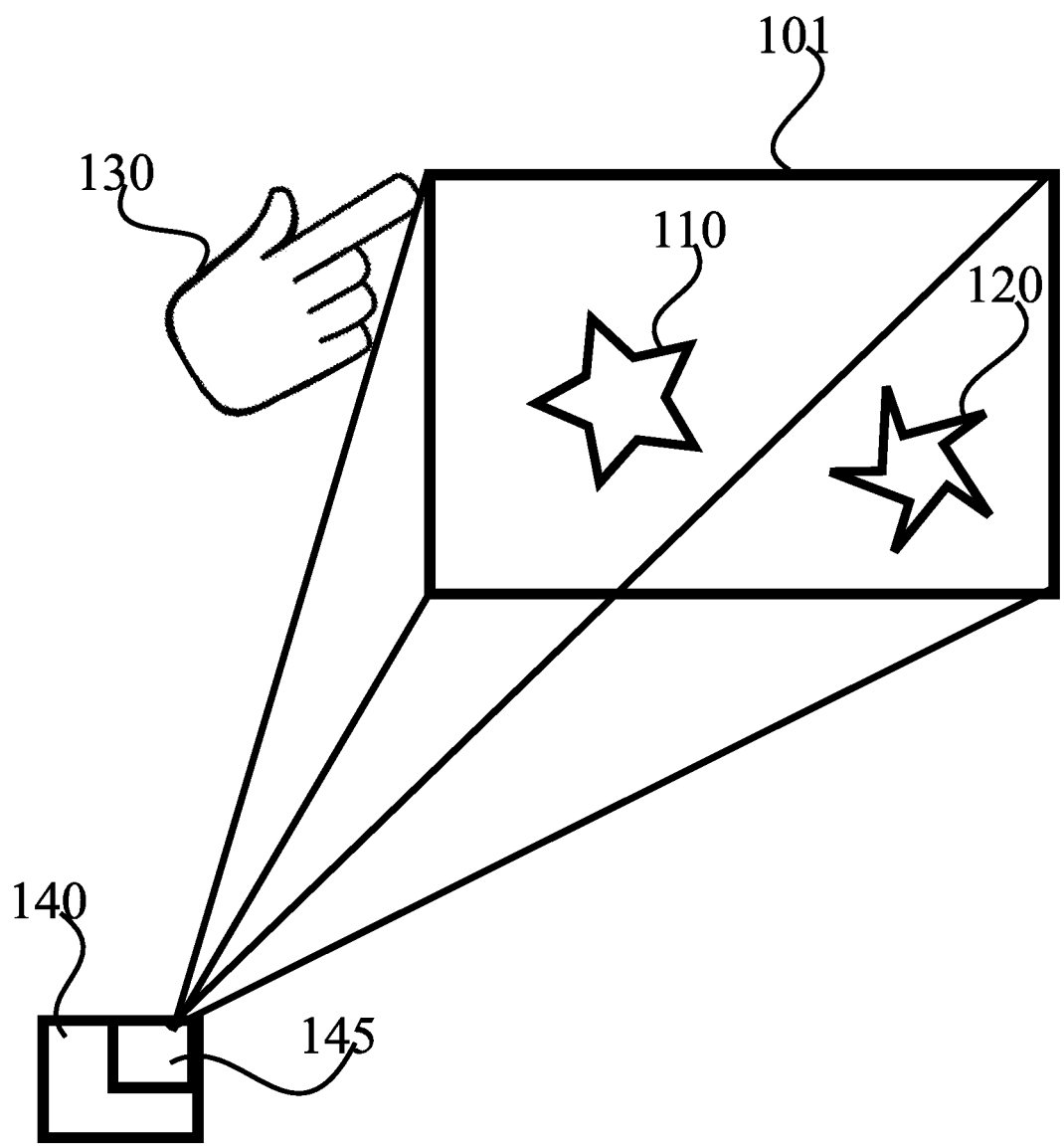
FIG. 1 illustrates an example system in accordance with at least some embodiments of the present invention.

FIG. 1 illustrates an example system in accordance with at least some embodiments of the present invention. The system of FIG. 1 comprises device 140, which may comprise part of a system arranged to convey sensor information to an output area. Device 140 may comprise a gaming console, enhanced television or other kind of suitable device. Device 140 comprises a sensor 145, which may comprise, for example, a video camera, stereo video camera or other suitable device enabled to obtain information from the surroundings of device 140.

Sensor 145 may be configured to detect in a field of view thereof a user's hand or other pointing element. A hand is illustrated as hand 130 in FIG. 1. A user may trigger sensor 145 to search for the pointing element by interacting with a user interface component of device 140, for example. The pointing element may have thereon a positioning aid to assist sensor 145 in determining, at least in part, a location of the pointing element. For example, a user may wear a glove or thimble constructed of a material that sensor 145 is configured to locate. Device 140 may comprise a Microsoft Kinect device, for example, the sensor thereof having a depth sensing mechanism. Alternatively, sensor 145 may be of a different type, but still have a depth sensing mechanism. In some other embodiments, sensor 145 does not have a depth sensing mechanism. An optical sensor, for example, may comprise a charge-coupled device, CCD, camera sensor.

By depth sensing mechanism it is meant, in general, that sensor 145 is capable of determining a distance between itself and the pointing element. Depth sensing may be implemented by a stereo camera and/or by emitting a sonic pulse and measuring a round-trip time to detection of its reflection from the pointing element, for example. A sonic pulse may comprise an ultrasound pulse, for example. In case a positioning aid is used, the positioning aid may reflect an electromagnetic pulse to enable depth sensing. In some embodiments, a positioning aid comprises an electromagnetic transmitter that device 140 may instruct to transmit information, enabling determination of the distance between device 140 and the positioning aid by determining a length of time it takes for information transmitted from the positioning aid to arrive in device 140.

The user may perform a gesture with the pointing element, the gesture defining an input area that frames at least one object the user is interested in monitoring. For example, in case the user is interested in a coffee maker, the user may, by the gesture, frame the coffee maker by gesturing a rectangular frame in the air around or in front of the coffee maker. Device 140 may be configured to observe movement of the pointing element during the gesture, and to derive therefrom first information, wherein the first information may comprise a digital representation of the gesture as observed by sensor 145. The gesture may comprise walking.

In general, the first information may be obtained using an image recognition mechanism. The image recognition mechanism may comprise hardware and software elements. For example, it may comprise at least one sensor and an image recognition software module running on at least one processor, wherein the image recognition software module may be configured to operate on a feed from the at least one sensor to produce the first information.

Based on the first information, an input area may be determined. For example, the input area may be assumed to be a rectangle, and the input area may be determined as a rectangle that is a best fit for the first information with a rectangular shape. In some embodiments, the input area is assumed to be an oval shape, and the input area is determined as an oval shape that a best fit for the first information with an oval shape. In some embodiments, the input area is not assumed to be any specific shape in advance, rather, the input area may be any shape, including an irregular shape, the shape being determined based on the first information. Thus the gesture defines the first information, and the first information in turn defines the input area. The first information may define the input area either by itself or in connection with an assumption concerning a shape of the input area, as described above.

Once the input area is known, device 140 or another device may cause a sensor to monitor the input area. For example, where a video camera is used as sensor, the video camera may be caused to turn and/or adjust a zoom setting so that the input area is within its field of view. Where a video camera is mounted on a rail, the video camera may be caused to move along the rail to obtain a better perspective to the input area. In some embodiments, the sensor that monitors the input area is sensor 145, but in other embodiments a second sensor is employed. The sensor monitoring the input area may be provided with information concerning borders of the input area, so that this sensor will capture sensor information originating from within the input area. While discussed herein primarily as an input area, it is to be understood that in a more general understanding of the invention, an input space is employed. An input space may comprise a two-dimensional or three-dimensional space, and the sensor may be arranged to obtain sensor data that originates from the input space.

In some embodiments, the sensor is configured to only capture sensor information from within the input area, Alternatively, a post-processing phase may be employed to remove from sensor information originating in the sensor monitoring the input area the part of the sensor information that does not originate in the input area.

In FIG. 1, object 110 and object 120 are in the input area. These objects may comprise, depending on the embodiment, coffee pots, cars, jewels, access doors or whatever it is desired to keep an eye on. By being in the input area it is in general meant that the objects are visible in a field of view of the sensor monitoring the input area, such that the objects are visible through a closed loop that is defined by the edge of the input area. In other words, the input area can be thought of as a virtual window floating in the air, and objects are from the point of view of the sensor monitoring the input area in the input area when they are visible through this virtual window.

Figure 2:
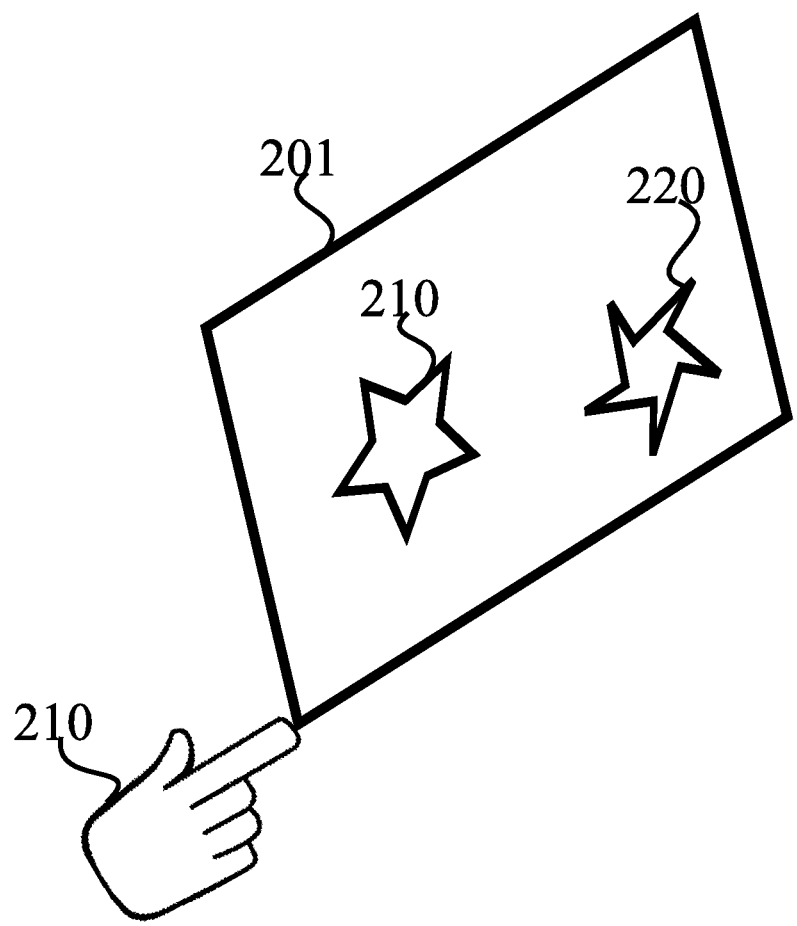
FIG. 2 illustrates an example system in accordance with at least some embodiments of the present invention.

FIG. 2 illustrates an example system in accordance with at least some embodiments of the present invention. In addition to defining an input area, the user may define a virtual output area. The user may define the virtual output area 201 after defining the input area, or the user may define virtual output area 201 before defining the input area. Defining virtual output area 201 may be achieved using a similar process as defining the input area, in detail, the user may perform a gesture in the air using a pointing element, such as, for example, his hand, to thereby cause a sensing device to capture second information that characterizes the gesture, and virtual output area 201 may be determined using the second information in a way that is analogous to the way the input area is determined. The sensing device used to capture the second information may be the same sensing device as is used to obtain the first information, or it may be a separate sensing device. At least in some embodiments, the shape of virtual output area 201 is the same as the shape of the input area. In other words, in these embodiments if the input area is a rectangle, virtual output area 201 may be rectangular. Where the input area and virtual output area 201 are rectangular, virtual output area 201 may have the same aspect ratio as the input area.

Where the shape of virtual output area 201 is the same shape as the shape of the input area it is sufficient that the user indicates with the gesture what size he wants virtual output area 201 to have, and where it should be located. Such a size indication may be provided with a pinch zoom gesture, for example.

Virtual output area 201 may be present in a view of a head mounted display of the user, such as, for example, an eyeglass display or a projector configured to project optically encoded information directly to an eye. An example of an eyeglass display type is the Google Glass product. When virtual output area 201 is present in a view of a head mounted display, the virtual output area may be visible to the user seemingly floating in air, or alternatively as seemingly attached to a real surface, such as a wall. While performing the gesture to define virtual output area 201, the user may be presented with feedback in the head mounted display view, to help the user dimension virtual output area 201 in a suitable way. In some embodiments virtual output area 201 is not present in a view of a head mounted display, but in a different view, such as, for example, that of a data projector arranged to project a display on a wall.

A server, for example, may control the overall system where sensor information from the input area is provided to virtual output area 201. This server may store information defining the input area and/or virtual output area 201. This server may receive the sensor information originating in the input area and cause the sensor information to be rendered in virtual output area 201. Rendering may comprise, for example, that a video feed from the input area is scaled to fit the virtual output area, and the scaled video feed is displayed in virtual output area 201. In some embodiments, the sensor information may comprise information on a temperature or radiation level in the input area, in which case rendering comprises deriving a suitable visual representation of the sensor information and causing the suitable visual representation to be displayed in virtual output area 201.

In FIG. 2, in virtual output area 201 are depicted representations 210 and 220 of objects in the input area, these objects corresponding to object 110 and object 120 in FIG. 1.

Sensor information from the input area may be continuously rendered on virtual output area 201. As virtual output area 201 may be present in a view of a head-mounted display or projected on a wall, virtual output area 201 in these cases does not consume screen space from a separate computer display the user may be using. In some embodiments, virtual output area 201 is not continuously presented to the user, but it is dynamically caused to appear responsive to a determination concerning the input area. Such a determination may comprise, for example, that there is movement in the input area, that a temperature in the input area changes or that a sound level exceeds a threshold in the input area. In some embodiments, a determination comprises analysing depth data and detecting a person or object crossing the input area or a boundary of the input area. These kinds of determinations may be based on determinations concerning changes in the sensor information originating in the input area, for example. Thus the user may be alerted to the fact his child has woken up, for example, as the virtual output area appears in the user's field of view as a response to the child making noises upon waking up. The human mind may easily perceive the appearance of virtual output area 201 when it was not previously present, which may conveniently catch the attention of the user to the fact that something has happened in the input area.

The server may be configured to record sensor information that is caused to be rendered in a virtual output area, for later observation. Recorded sensor information may be furnished with metadata, such as, for example, at least one timestamp indicating a time when the sensor information was obtained.

The user may define more than one input area, such that a virtual output area is configured to appear in his field of vision responsive to an event occurring that concerns at least one of the input areas. For example, a security guard may have defined all the doors of a building as input areas. When no-one is moving through any of the doors, such as during quiet night-time, no virtual output areas appear in the guard's field of vision. However, once someone moves through a door, a virtual output area may be caused to appear in the guard's field of vision, capturing his attention and displaying the movement at the door. An advantage of more than one input area in this regard is that the user may effectively monitor a plurality of input areas without being distracted, since the sensor information is rendered, in these embodiments, to the user only as a response to something occurring at the input area.

A distance between an input area and the virtual output area may be small or large. In principle, the user need not be, but may be, in the same building as the input area. Where internet protocol, IP, networking is used, the user may even be on another continent than the input area.

Figure 3:
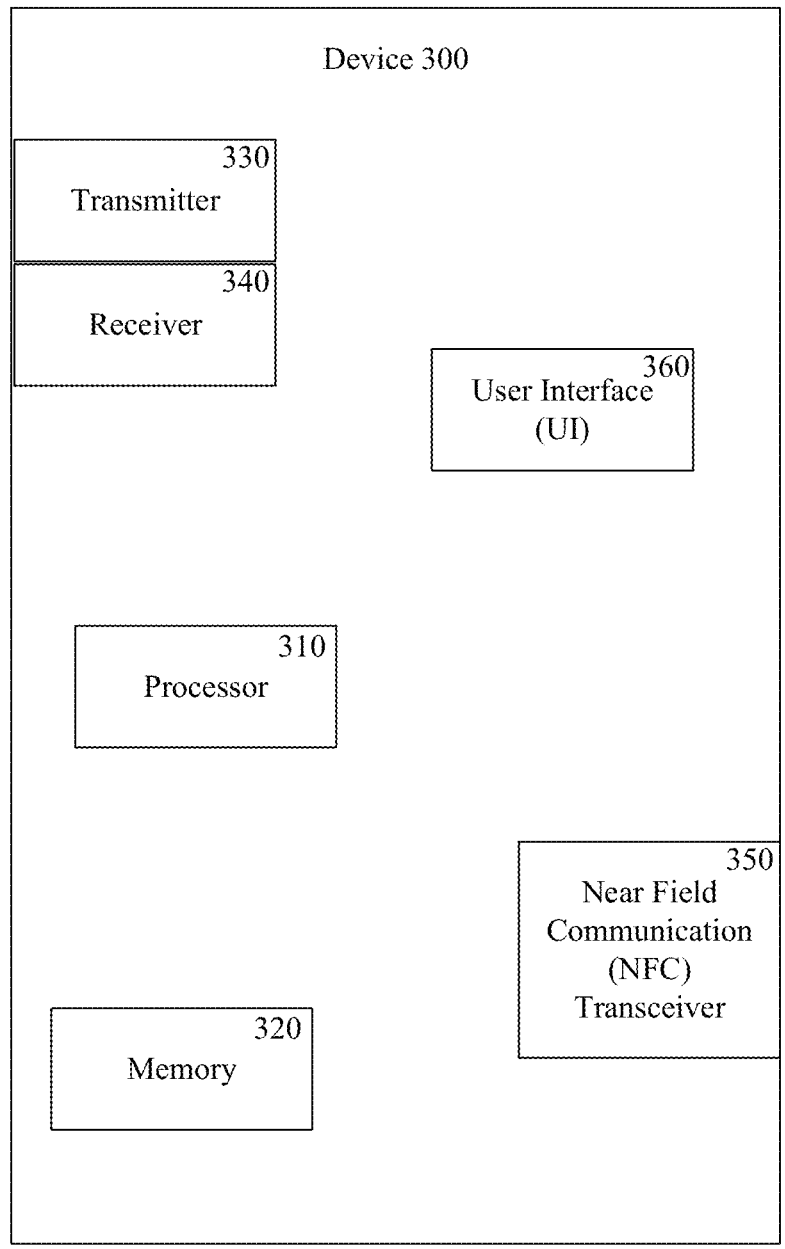
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a server or other kind of computing device. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Core processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies. Via transmitter 330, receiver 340 and/or NFC transceiver 350, device 300 may be in communication with at least one sensor device, receive sensor information and/or provide sensor information for rendering on a virtual output area.

Device 300 may comprise user interface, UI, 360. UI 360 may comprise at least one of a display, a keyboard, and a touchscreen. A user may be able to operate device 300 via UI 360, for example to configure an input area or a virtual output area.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350.

Processor 310, memory 320, transmitter 330, receiver 340, NFC transceiver 350 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
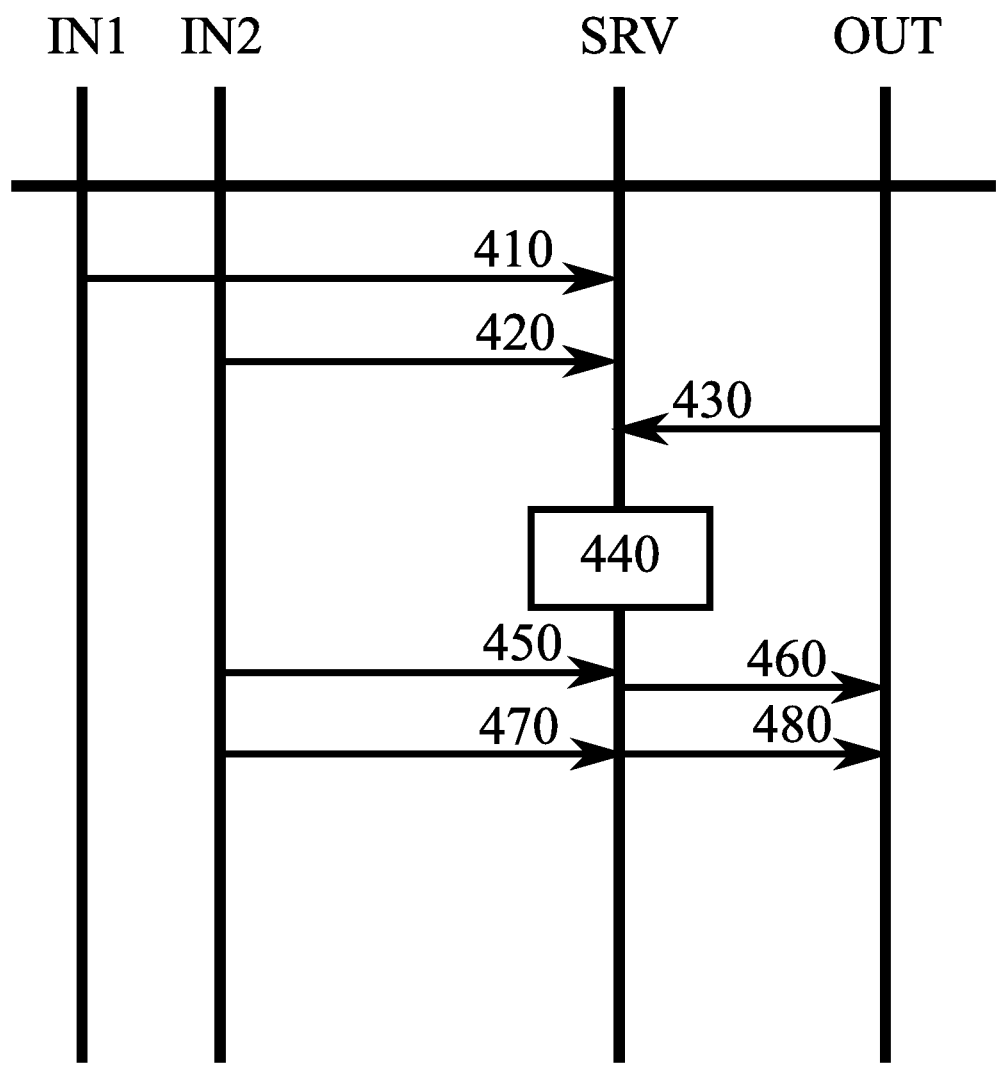
FIG. 4 illustrates signalling in accordance with at least some embodiments of the present invention.

FIG. 4 illustrates signalling in accordance with at least some embodiments of the present invention. On the vertical axes are disposed, from left to right, first input IN1, second input IN2, server SRV and output device OUT. First input IN1 may comprise a device such as device 140 of FIG. 1. Second input IN2 may be a device of similar, but not necessarily the same, type as first input IN1. Server SRV may comprise a computing device such as that illustrated in FIG. 3. Output device OUT may comprise a head-mounted or projective display, for example, or a control device thereof. In some embodiments, server SRV may be integrated in a same physical device as first input IN1, second input IN2 or output device OUT, for example. In the figure, time advances from the top toward the bottom, although the order of messages is not necessarily the same as illustrated here. In some embodiments of the invention, there is only one input device, or more than two input devices.

In phase 410, server SRV receives a message from first input IN1, informing server SRV that a user has defined an input area with first input IN1. In phase 420, server SRV receives a message from second input IN2, informing server SRV that a user has defined an input area with second input IN2.

In phase 430, server SRV receives a message from output device 430 informing server SRV that a virtual output area has been defined. The message of phase 430 may inform server SRV of characteristics of the virtual output area, such as for example it's resolution. Phases 410, 420 and 430 need not take place in the order illustrated in FIG. 4.

In phase 440, server SRV may wait for sensor information to be provided from first input IN1 and/or second input IN2. For example, the system may be configured to render sensor information in the virtual output area responsive to a determination performed based at least in part on the sensor information. In phase 440, server SRV knows potential inputs and at least one potential output from the messages of phases 410, 420 and 430. Server SRV may also know, for example, respective sizes of the inputs and output, enabling server SRV to know whether scaling needs to be done in rendering sensor information from an input to the virtual output area.

In phase 450, second input IN2 informs server SRV of movement in the input area of second input IN2. Responsively, server SRV informs output device OUT that data will shortly be incoming. Phases 450 and 460 are optional, in other words, they are absent in some embodiments. In some embodiments, second input IN2 continuously provides to server SRV sensor information from its input area, and server SRV makes a determination based at least in part on the sensor information that movement occurs in the input area of second input IN2.

In phase 470, sensor information is provided from second input IN2 to server SRV. The sensor information may comprise a video feed, for example. In phase 480, server SRV provides the sensor information to output device OUT for rendering in the virtual output area. Server SRV may process, at least in part, the sensor information before passing it on to output device OUT. Such processing may comprise scaling, for example.

In case output device OUT has low communication and/or processing capability, it may be advantageous to scale a video feed arriving in server SRV to a lower resolution, so that output device OUT receives a lower-resolution video feed that it is capable of handling.

Figure 5:
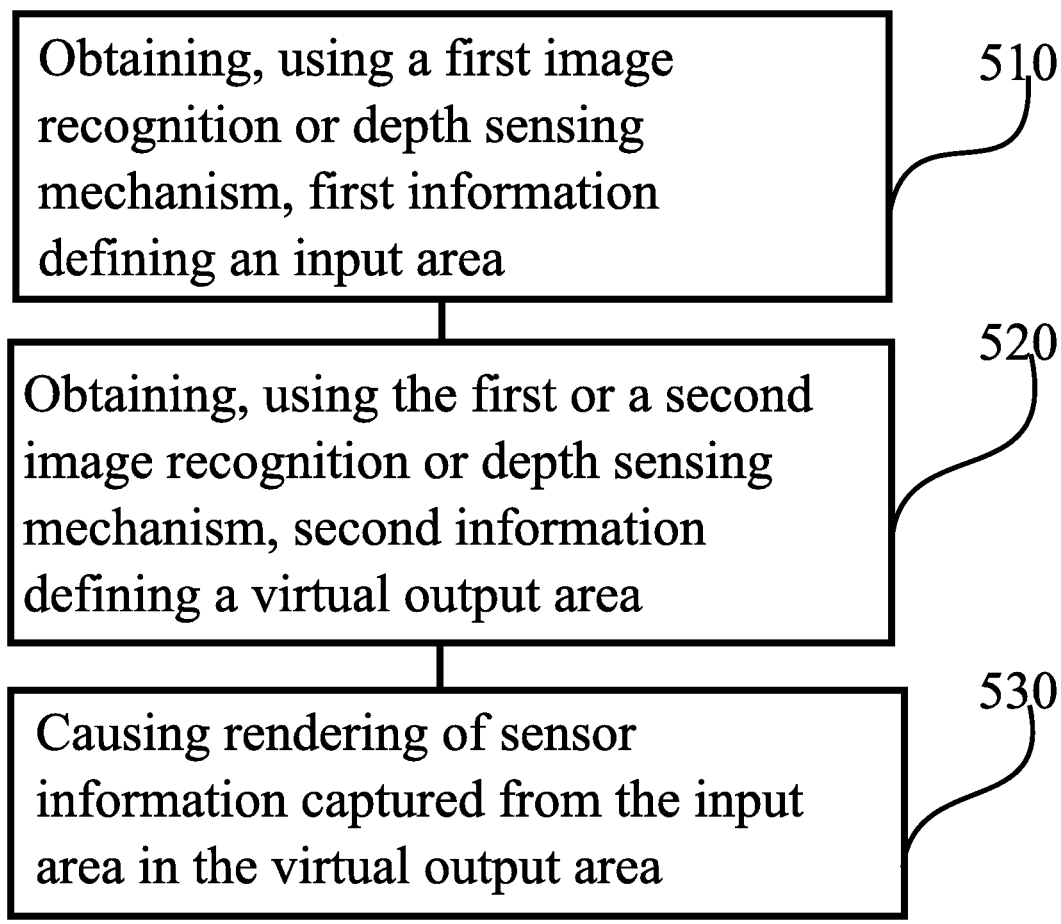
FIG. 5 is a flow graph illustrating a method in accordance with at least some embodiments of the present invention.

FIG. 5 is a flow graph illustrating a method in accordance with at least some embodiments of the present invention. The phases of the illustrated method may be performed in device 140, server SRV or a control device, for example.

Phase 510 comprises obtaining, using a first image recognition or depth sensing mechanism, first information defining an input area. Phase 520 comprises obtaining, using the first or a second image recognition or depth sensing mechanism, second information defining a virtual output area. Finally, phase 530 comprises causing rendering of sensor information captured from the input area in the virtual output area. In general, an image recognition or depth sensing mechanism may comprise an image recognition mechanism and/or a depth sensing mechanism.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in facilitating rendering of sensor information.

REFERENCE SIGNS LIST

| | |
|---|---|
| 101 | Input area |
| 110, 120 | Objects |
| 130 | Hand |
| 140 | Device |
| 145 | Sensor |
| 201 | Virtual output area |
| 210 | Hand |
| 210, 220 | Representations of objects 110 and 120 |
| 300 | Device |
| 310 | Processor |
| 320 | Memory |
| 330 | Transmitter |
| 340 | Receiver |
| 350 | NFC transceiver |

-continued

| 360 | User Interface |
| 410-480 | Phases of the method of FIG. 4 |

The invention claimed is:

1. An apparatus comprising:
at least one processor; and
at least one memory including computer program code for one or more programs, the at least one memory and the computer program code configured to, with the at least one processor, cause the apparatus to perform at least:
receive an indication of a first gesture input provided in space by a user, the first gesture input detected with at least a first depth sensor, and the first gesture input defining an area in the space as an input space;
in response to receiving the indication of the first gesture input, cause a video sensor of a first device to monitor the input space;
obtain second information defining a virtual output area from a second depth sensor, wherein the second information is derived from a second gesture input performed by the user in a different location than the first gesture input, and a different location than that of the first depth sensor, and captured by the second depth sensor; and
cause rendering of, on a second device, sensor information monitored by the video sensor of the first device as a video feed from the input space defined by the first gesture input by controlling at least a wearable see-through display of the second device, wherein the rendered sensor information is perceivable as displayed in the virtual output area defined by the second gesture input in the different location than that of the first depth sensor and first gesture input.

2. The apparatus of claim 1, wherein the apparatus is configured to cause the sensor information to be rendered in the virtual output area via a head mounted display, to enable the user to experience the virtual output area as a virtual screen hovering in air.

3. The apparatus of claim 2, wherein the head mounted display comprises at least one of an eyeglass display and a projector configured to project optically encoded information directly to an eye.

4. The apparatus of claim 1, wherein the apparatus is configured to provide, based at least in part on the first gesture input, control inputs to the video sensor device of the first device to cause the video sensor device of the first device to capture the sensor information from the input space.

5. The apparatus of claim 1, wherein the apparatus is configured to determine the first gesture input based on at least one optical sensor and a depth sensing capability.

6. The apparatus of claim 1, wherein the apparatus is configured to determine the second gesture input based on at least one optical sensor and a depth sensing capability.

7. The apparatus of claim 1, wherein the apparatus is configured to cause the rendering of the sensor information in the virtual output area in a continuous manner.

8. The apparatus of claim 1, wherein the apparatus is configured to cause the rendering of, on the second device the sensor information in the virtual output area responsive to a determination concerning the input space defined by the first gesture input.

9. The apparatus of claim 8, wherein the determination concerning the input space comprises a determination there is movement in the input space defined by the first gesture input.

10. The apparatus of claim 9, wherein the determination there is movement in the input space defined by the first gesture input is based on the sensor information.

11. The apparatus of claim 10, wherein the determination there is movement in the input space defined by the first gesture input is based on depth information comprised in the sensor information.

12. The apparatus of claim 9, wherein the determination concerning the input space defined by the first gesture input comprises a determination that a sound level in or near the input space exceeds a threshold sound level.

13. A method comprising:
receiving an indication of a first gesture input provided in space by a user, the first gesture input detected with at least a first depth sensor, and the first gesture input defining an area in the space as an input space;
in response to receiving the indication of the first gesture input, causing a video sensor of a first device to monitor the input space;
obtaining second information defining a virtual output area from a second depth sensor, wherein obtaining the second information comprises deriving the second information from a second gesture input performed by the user in a different location than the first gesture input, and a different location than that of the first depth sensor and captured by the second depth sensor; and
causing rendering of, on a second device, sensor information monitored by the video sensor of the first device as a video feed from the input space defined by the first gesture input by controlling at least a wearable see-through display of the second device, wherein the rendered sensor information is perceivable as displayed in the virtual output area defined by the second gesture input in the different location than that of the first depth sensor and first gesture input.

14. The method according to claim 13, wherein the sensor information is caused to be rendered in the virtual output area via a head mounted display, to enable the user to experience the virtual output area as a virtual screen hovering in air.

15. The method according to claim 14, wherein the head mounted display comprises at least one of an eyeglass display and a projector configured to project optically encoded information directly to an eye.

16. The method according to claim 13, wherein based at least in part on the first gesture input, control inputs are provided to the video sensor device of the first device to cause the video sensor device of the first device to capture the sensor information from the input space.

17. The method according to claim 13, further comprising determining the first gesture input based on at least one optical sensor and a depth sensing capability.

18. The method according to claim 13, further comprising determining the second gesture input based on at least one optical sensor and a depth sensing capability.

19. The method according to claim 13, wherein the sensor information is caused to be rendered on the second device in the virtual output area responsive to a determination concerning the input space defined by the first gesture input.

20. The method according to claim 19, wherein the determination concerning the input space comprises a determination there is movement in the input space defined by the first gesture input.

* * * * *